United States Patent [19]

Naarmann et al.

[11] 4,012,366

[45] Mar. 15, 1977

[54] POLYMERS CONTAINING HYDROXAMIC ACID-O-SULFONYL GROUPS

[75] Inventors: Herbert Naarmann, Wattenheim; Heinz Pohlemann, Limburgerhof, both of Germany

[73] Assignee: BASF Aktiengesellschaft, Ludwigshafen (Rhine), Germany

[22] Filed: Nov. 17, 1975

[21] Appl. No.: 632,642

[30] Foreign Application Priority Data

Nov. 27, 1974 Germany .......................... 2456007

[52] U.S. Cl. ........................... 260/79.7; 260/456 A; 260/DIG. 17; 526/304; 526/307; 526/312
[51] Int. Cl.² .......................................... C08G 75/00
[58] Field of Search ..................... 260/79.7, 456 A; 526/304, 307, 312

[56] References Cited

UNITED STATES PATENTS 3,689,485   9/1972   Clauss et al. .................. 260/456 A

*Primary Examiner*—Ronald W. Griffin
*Attorney, Agent, or Firm*—Johnston, Keil, Thompson & Shurtleff

[57] ABSTRACT

Polymers which contain hydroxamic acid-O-sulfonyl groups in the side chains and which accordingly can undergo important substitution reactions. The polymers may also contain other reactive groups and may be used for the manufacture of moldings, coatings or adhesives.

5 Claims, No Drawings

POLYMERS CONTAINING HYDROXAMIC ACID-O-SULFONYL GROUPS

The present invention relates to new polymers and to a process for their manufacture.

It is an object of the present invention to provide polymers which exhibit the reactivity of hydroxamic acid-O-sulfonyl compounds and may in addition contain other reactive groups.

We have found that this object is achieved by polymers which contain structural units of the general formula

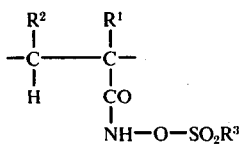

where $R^1$ is hydrogen or methyl, $R^2$ is hydrogen, carboxyl, a carboxylate salt, an ester or amide group or a hydroxamic acid-O-sulfonyl group and $R^3$ is alkyl, cycloalkyl or aryl.

These polymers are high molecular weight materials which contain hydroxamic acid-O-sulfonyl groups in the side chains and which accordingly can undergo important substitution reactions. The new polymers may have molecular weights of from 1,000 to 3,000,000, perferably from 10,000 to 100,000.

It is a further object of the present invention to provide a method of making such polymers.

We have found that this object is achieved by homopolymerizing monomers of the general formula

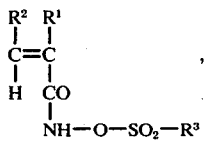

where $R^1$ is H or $CH_3$, $R^2$ is H, COOR, COOM, CONHR or $NH\text{-}OSO_2\text{-}R^3$, where M is a metal cation and R is H, alkyl, cycloalkyl or aryl, and $R^3$ is alkyl, cycloalkyl or aryl, or copolymerizing these monomers with other unsaturated monomers.

Particularly suitable unsaturated hydroxamic acid-O-sulfonyl derivatives are the compounds I to IV:

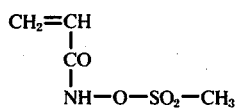

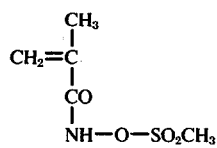

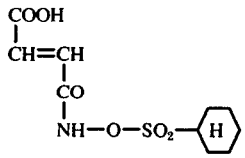

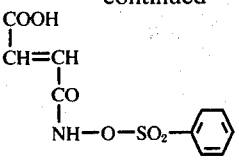

Such derivatives may be manufactured by reacting the corresponding acid chlorides with hydroxylamine or a hydroxylamine salt to give the corresponding hydroxamic acids, and then reacting the latter with sulfonyl chlorides.

Examples of suitable comonomers are olefins, e.g. ethylene, propylene, butadiene and isoprene, styrene and substituted styrenes, e.g. α-methylstyrene, p-chlorostyrene and p-methylstyrene, esters of acrylic acid and methacrylic acid, e.g. with methanol, ethanol, butanol or ethylcyclohexanol, hydroxy derivatives and amino derivatives of esters of acrylic acid, e.g. hydroxypropyl acrylates or dimethylaminoethyl acrylate, acrylamides and methacrylamides and substituted amides, e.g. N-methylolacrylamide, N-methylolmethacrylamide or their esters, acrylonitrile and methacrylonitrile, vinyl esters, e.g. vinyl acetate and vinyl propionate, vinyl ethers, e.g. methyl vinyl ether or ethyl vinyl ether, and fumaric acid, maleic acid or itaconic acid, and esters and anhydrides of these acids. It is also possible simultaneously to copolymerize two or more of these monomers with the hydroxamic acid-O-sulfonyl derivatives.

The proportion of unsaturated hydroxamic acid-O-sulfonyl derivatives used in manufacturing the copolymers can vary within wide limits, and can, e.g., be from 1 to 99 percent by weight and especially from 5 to 20 percent by weight.

The polymerization may be initiated either thermally or by means of conventional free radical initiators. Examples of suitable initiators are hydrogen peroxide, inorganic peroxides, and organic hydroperoxides and peroxides, aliphatic azo compounds which decompose to radicals, redox catalyst systems, e.g. the system of persulfate and ascorbic acid, sodium bisulfite or iron-II salts, as well as the transition metal chelates known to form free radicals, especially those wherein the metal is of suitable valency, e.g. chelates of manganese (III), cobalt (III), copper (II) and cerium (IV) with 1,3-dicarbonyl compounds.

The initiators are in general used in amounts of from 0.05 to 5 percent by weight, based on the amount of monomer. The optimum amount and the most effective initiator may easily be found by tests.

The polymerization may be carried out in bulk, but also in the presence of solvents or diluents, e.g. alcohols, ketones, ethers, aliphatic, cycloaliphatic or aromatic hydrocarbons, formamide and dimethylformamide. Water is preferred as the diluent.

The suspension polymerization, solution polymerization or emulsion polymerization processes conventionally used for other monomers are also suitable for the above process. In respect to the assistants which may be used, e.g. buffers, dispersing agents, protective colloids and the like, the above process again does not differ from conventional processes.

The polymerization may be carried out within a wide range of temperatures, conveniently from about 0° to 100° C and preferably from 50° to 85° C. In general, the polymerization is carried out under atmospheric pressure, but reduced pressure or superatmospheric pressure, e.g. of up to 3,000 atmospheres, may also be employed. Particularly when using low-boiling comonomers, higher pressures are used to bring about a sufficient concentration of comonomer in the reaction mixture.

The copolymerization of the unsaturated hydroxamic acid-O-sulfonyl derivatives with ethylene or butadiene is advantageously carried out in emulsion; the copolymerizable monomers are introduced into an aqueous soap emulsion which contains an initiator, a buffer system, and, optionally, a protective colloid, and are copolymerized under superatmospheric pressure. The copolymerization with esters of acrylic acid is suitably carried out in aromatic or aliphatic hydrocarbons, under the conventional conditions for the polymerization of such esters.

The polymers of the invention may be used, e.g., to manufacture moldings, coatings or adhesives, and may also be used as mixtures with other plastics, e.g. polyethylene, polypropylene or copolymers of ethylene and vinyl acetate. Such products accept dyes, since the hydroxamic acid-O-sulfonyl groups can undergo crosslinking reactions and secondary reactions. Because of their surface-active properties and antistatic properties, the polymers manufactured according to the invention may, inter alia, also be used for the finishing of paper and textiles. Copolymers of esters of acrylic acid, which contain from about 2 to 20 percent by weight of the hydroxamic acid-O-sulfonyl derivatives and from about 2 to 10 percent by weight of hydroxylic monomers, e.g. hydroxypropyl acrylate, may be used as surface coatings. If, in addition to the hydroxamic acid-O-sulfonyl groups, the polymers contain further reactive groups, e.g. —OH, —NH$_2$ or —COOH, which have been introduced by copolymerization, the product can be crosslinked by heating and may be used as a reactive surface coating.

In the Examples, parts and percentages are by weight. The K values are mean molecular weight and were in each case determined on one per cent strength solutions in dimethylformamide, in accordance with the method of H. Fikentscher, Cellulosechemie 13, 58 (1932).

EXAMPLE 1

100 parts of the hydroxamylsulfonyl derivative I and 0.1 part of azo-bis-isobutyronitrile are heated for 4 hours at 60° C under nitrogen, whilst stirring. After precipitation with methanol, washing and drying, 90 parts of a polymer of K value 38, having a glass transition temperature $T_G$ of +38° C, are obtained. The polymer has a sulfur content of 18.8% (theory: 19.39%) and a nitrogen content of 7.0% (theory: 7.18%).

EXAMPLES 2 TO 12

Ethyl acrylate and the hydroxamylsulfonyl compound II are mixed in certain ratios and after addition of 0.1% of azo-bis-isobutyronitrile each mixture is heated at 70° C for 2 hours. The copolymers were precipitated with methanol, washed and dried for 10 hours in a vacuum drying oven at 60° C and 12 mm Hg. The properties of the products obtained are summarized in the Table which follows:

| Example | % by weight of II in the starting mixture | Conversion (% by weight) | K-value | % by weight of II in the copolymer |
|---|---|---|---|---|
| 2 | 1 | 96.5 | 56 | 0.7 |
| 3 | 5 | 94.0 | 55 | 4.0 |
| 4 | 10 | 96.5 | 52 | 9.1 |
| 5 | 20 | 96.0 | 58 | 16.5 |
| 6 | 30 | 96.5 | 59 | 25.0 |
| 7 | 40 | 99.0 | 59 | 34.0 |
| 8 | 50 | 93.5 | 59 | 43.0 |
| 9 | 60 | 98.0 | 58 | 55.6 |
| 10 | 70 | 100.0 | 56 | 64.5 |
| 11 | 80 | 100.0 | 44 | 76.5 |
| 12 | 90 | 100.0 | 40.5 | 87.3 |

EXAMPLE 13

30 parts of the hydroxamylsulfonyl derivative III, 2 parts of sodium pyrophosphate, 4.5 parts of potassium persulfate, 2 parts of the sodium salt of a sulfonated fatty alcohol of 10 to 15 carbon atoms and 1,000 parts of water are mixed. Butadiene is forced into this mixture, whilst stirring, for 8 hours at 90° C, in such amounts that the butadiene pressure in the gas space is 2.85 atmospheres gauge. After a reaction time of eight hours the solids content of the dispersion is 20 percent by weight. The K value of the polymer is 46. The polymer contains 10.9% of compound III introduced by copolymerization.

EXAMPLE 14

The procedure of Example 13 is followed except that the hydroxamic acid-O-sulfonyl derivative IV is used, and is copolymerized with styrene. A dispersion of 25% solids content is obtained in 8 hours at 90° C. The K value of the copolymer, which contains 18.5 percent by weight of compound IV introduced by copolymerization, is 44.5.

EXAMPLE 15

If the procedure of Example 9 is followed but the ethyl acrylate is replaced by acrylonitrile, a conversion of 81%, a K value of 51 and a 42% content of compound II introduced by copolymerization are obtained.

We claim:
1. A polymer which contains structural units of the general formula

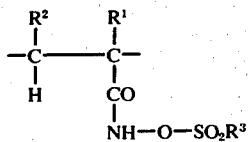

where $R^1$ is H or $CH_3$, $R^2$ is H, COOR, COOM, CONHR or $NH-OSO_2-R^3$, where M is a metal cation and R is H, alkyl, cycloalkyl or aryl, and $R^3$ is alkyl, cycloalkyl or aryl.

2. A polymer as claimed in claim 1, wherein $R^1$ and $R^2$ are H and $R^3$ is $CH_3$.

3. A polymer as claimed in claim 1, wherein $R^1$ is $CH_3$, $R^2$ is H and $R^3$ is $CH_3$.

4. A polymer as claimed in claim 1, wherein $R^1$ is H, $R^2$ is COOH and $R^3$ is $C_6H_{11}$.

5. A polymer as claimed in claim 1, wherein $R^1$ is H, $R^2$ is COOH and $R^3$ is $C_6H_5$.

* * * * *